3,254,115
METHOD OF MAKING PROPARGYL ACRYLATE
Murray S. Cohen, Convent Station, and Sidney I. Karlan, Nutley, N.J., assignors to Thiokol Chemical Corporation, Trenton, N.J., a corporation of Delaware
No Drawing. Filed Oct. 14, 1958, Ser. No. 767,238
3 Claims. (Cl. 260—486)

This invention relates to a new composition of matter and to the process of making it and more particularly to propargyl acrylate.

Solid propellants useful as high energy fuels may be composed of a polymeric substance having incorporated physically within its matrix compounds. Of the boron compounds decaborane has been found most useful principally because of its high energy content. A primary difficulty in the utilization of decarborane is obtaining the desired distribution throughout the propellant and dispersing sufficiently high concentrations throughout the polymer without deleterious injury to the physical properties of the propellant. It has been found possible to couple the decaborane chemically to an acetylenic bond of a carbon chain which appears to provide a means for its incorporation into a polymer. Unfortunately polymerizable acetylenic derivatives suitable for reaction with the decaborane and susceptible of synthesis into monomers which provide a high concentration of boron to carbon are unknown in the prior art.

It is therefore an object of this invention to produce a new chemical compound which is of value in the synthesis of boron-containing polymers. Additional objects will appear hereinafter.

In accordance with the object of this invention, propargyl acrylate has been synthesized.

It has been discovered that an acetylenic alcohol, propargyl alcohol, will readily react in substantially equimolar proportions with the chloride of an unsaturated acid, acrylyl chloride, when in the presence of scavenger for acid to produce propargyl acrylate in high yield. The reaction may be pictured as follows:

$$HC \equiv C-CH_2OH + ClOC-HC=CH_2$$
$$\rightarrow HC \equiv C-CH_2OOC-HC=CH_2 + HCl$$

The inventive product is a clear, colorless liquid. As is apparent from the reaction, longer chain alkenyl acid chlorides as 3-butenoic chloride could equally be used to react with the acetylenic alcohol.

The scavenger or acid acceptor for acid performs the well-known function of chemically removing the influence of one of the reaction products, the hydrogen chloride, from the reaction medium so as to effect high yields of the desired product. Such scavengers or acid acceptors include triethylamine, diethylamine, n-propylamine, n-butylamine, pyridine, dimethylaniline, picolines and quinolines; all of which readily combine with the hydrogen chloride to yield crystalline salts insoluble in the reaction medium.

The reaction medium can be of any inert organic liquid exhibiting suitable solubility for the acetylenic alcohol. Such solvents include benzene, toluene and diethyl ether. The choice of solvent will of course depend upon the physical reaction conditions.

The temperature at which the reaction can be carried out is not critical but may range from about room temperature upward limited only by practical consideration of the nature of the solvent medium, reactants, scavenger and products.

The following example will serve to illustrate the preparation of propargyl acrylate. Obviously the process of the invention is not to be limited to the details given as the reaction conditions may be varied widely within the scope of the preceding general discussion.

*Example*

A 500 ml., 3-necked, round bottomed flask was charged with a mixture of 28 g. (0.5 mol) of propargyl alcohol, 51 g. (0.5 mol) of triethylamine and 50 ml. of dried benzene. To the stirred solution there was added, dropwise and slowly, a solution of 45 g. (0.5 mol) of acrylyl chloride in 50 ml. of dried benzene. After adding all of the acrylyl chloride solution, the mixture of solids and liquid was stirred for an hour. The triethylammonium hydrochloride was then separated by collection on a Büchner funnel and washed with dried benzene. The pooled filtrate and wash liquor was fractionated under vacuum to yield 33 grams (60% yield) of clear, colorless liquid having a boiling point of 38° C./12 mm. and $n_D^{25}$ of 1.4421. The analysis was:

| | Percent | |
|---|---|---|
| | C | H |
| Calculated for $C_6H_6O_2$— | 65.44 | 5.49 |
| Found | 65.18 | 5.71 |

This novel compound, propargyl acrylate, readily combines with bis(acetonitrilo) decaborane, to yield acetonitrile and an organo boron monomer having a representative structure:

$$HC{=\!=\!=}C-CH_2OOC-HC=CH_2$$
$$\diagdown\!\diagup$$
$$B_{10}H_{12}$$

and designated as 11-vinylene decaboranyl methyl acrylate which homopolymerizes through the vinyl group by the influence of a free radical initiator to yield a polymer of high boron content and molecular weights in excess of 1100. Such a polymer is extremely valuable in high energy solid propellants.

As many apparently widely different embodiments of this invention may be made without departing from the spirit and scope hereof, it is to be understood that the invention is not limited to the specific embodiments hereof except as defined in the appended claims.

We claim:
1. The process for making propargyl acrylate which comprises contacting propargyl alcohol and acrylyl chloride in an inert organic solvent for propargyl alcohol and in the presence of an amine acceptor for acids.
2. The process according to claim 1 wherein said inert solvent is dried benzene.
3. The process according to claim 2 wherein said amine acceptor for acid is triethylamine.

References Cited by the Examiner
UNITED STATES PATENTS
2,340,701  2/1944  Schlichting et al. _____ 260—456
2,899,391  8/1959  Mayhew et al. _____ 252—56

OTHER REFERENCES
Crawford: Jour. Chem. Ind., vol. 68, pp. 201–208 (1949).
Hoff et al.: "Jour. of Polymer Sci.," 18, 161–76 (1955).

LORRAINE A. WEINBERGER, *Primary Examiner.*

LEON D. ROSDOL, ROGER L. CAMPBELL, CARL D. QUARFORTH, W. I. ANDRESS, J. W. WHISLER, D. P. CLARKE, A. P. HALLUIN, *Assistant Examiners.*